US011310367B2

(12) United States Patent
Udeshi et al.

(10) Patent No.: US 11,310,367 B2
(45) Date of Patent: Apr. 19, 2022

(54) WIRELESS NETWORK INSTALLATION ANALYZER AND REPORTING

(71) Applicant: TIME WARNER CABLE ENTERPRISES LLC, St. Louis, MO (US)

(72) Inventors: Dharmen K. Udeshi, Fairfax, VA (US); Ashish A. Patel, Reston, VA (US); Vijay Venkateswaran, Fairfax, VA (US)

(73) Assignee: Time Warner Cable Enterprises LLC, St. Louis, MO (US)

( * ) Notice: Subject to any disclaimer, the term of this patent is extended or adjusted under 35 U.S.C. 154(b) by 1066 days.

(21) Appl. No.: 14/282,619

(22) Filed: May 20, 2014

(65) Prior Publication Data

US 2015/0341502 A1 Nov. 26, 2015

(51) Int. Cl.
| | |
|---|---|
| *H04M 15/00* | (2006.01) |
| *H04W 16/18* | (2009.01) |
| *H04L 12/24* | (2006.01) |
| *H04L 12/14* | (2006.01) |
| *H04L 41/14* | (2022.01) |

(52) U.S. Cl.
CPC .......... *H04M 15/58* (2013.01); *H04L 41/145* (2013.01); *H04M 15/51* (2013.01); *H04W 16/18* (2013.01); *H04L 12/1485* (2013.01)

(58) Field of Classification Search
None
See application file for complete search history.

(56) References Cited

U.S. PATENT DOCUMENTS

| | | | | |
|---|---|---|---|---|
| 7,376,098 | B2 * | 5/2008 | Loeffler | H04W 48/08 370/329 |
| 7,978,629 | B2 * | 7/2011 | Resende | H04L 41/0806 370/254 |
| 7,999,742 | B2 * | 8/2011 | Alizadeh-Shabdiz | G01S 5/0257 342/463 |
| 8,040,864 | B2 | 10/2011 | Karaoguz et al. | |
| 8,645,251 | B2 * | 2/2014 | Egner | G06Q 10/0637 705/35 |
| 9,210,600 | B1 * | 12/2015 | Jadunandan | H04W 24/08 |

(Continued)

OTHER PUBLICATIONS

Pereira, A cost model for broadband access networks: FTTx versus WiMAX, 2007 (Year: 2007).*

*Primary Examiner* — Mohamed N El-Bathy
(74) *Attorney, Agent, or Firm* — Armis IP Law, LLC

(57) ABSTRACT

An analyzer resource receives density information indicating mobile device usage in each of multiple geographical regions. The analyzer resource further receives resource information indicating locations of physical network resources available to support installation of wireless access points in the geographical regions and the location of any existing wireless access points already installed. The analyzer resource then uses at least the density information and the resource information to produce a respective metric for each of the multiple geographical regions. The respective metric for a corresponding geographical region indicates a desirability of installing a respective wireless access point in the corresponding geographical region. Further disclosed embodiments herein include generating a respective map indicating in which respective geographical regions it is desirable to install a respective wireless access point.

29 Claims, 10 Drawing Sheets

(56) References Cited

U.S. PATENT DOCUMENTS

| | | | |
|---|---|---|---|
| 9,288,689 B2* | 3/2016 | Lee .................. | H04W 24/00 |
| 2003/0158668 A1* | 8/2003 | Anderson ............. | G06T 17/05 |
| | | | 702/5 |
| 2007/0019961 A1* | 1/2007 | Pembroke ............. | G06Q 30/00 |
| | | | 398/128 |
| 2010/0197239 A1* | 8/2010 | Catovic ............... | H04W 24/08 |
| | | | 455/67.11 |
| 2010/0317285 A1* | 12/2010 | Jang .................. | H04B 7/155 |
| | | | 455/7 |
| 2014/0051451 A1* | 2/2014 | Goldberg ............. | H04W 16/18 |
| | | | 455/446 |
| 2015/0215791 A1* | 7/2015 | Geller ................. | H04W 24/02 |
| | | | 455/446 |

* cited by examiner

WIRELESS NETWORK INSTALLATION ANALYZER AND REPORTING

BACKGROUND

Conventional RF (Radio Frequency) technology has been used for many years to connect wireless devices such as phones, laptops, etc., to a landline network and/or other wireless networks. Today, RF technology supports many different types of connection services such as voice communications, high-speed data services, WiFi™ connectivity, and so on.

One type of mature RF technology is so-called cellular network technology. Conventional cellular network technology typically includes an expansive land area that has been divided into so-called cellular regions. A single cellular base station typically resides in each cell. The single cellular base station typically provides coverage over multiple square miles of land. Often, a base station in a respective cell is connected to a landline network. Via wireless phone communications between the respective cell phone and base station, the wireless subscriber operating a cell phone in the cellular region is able to communicate with or have access to the landline network.

Another type of RF technology is known as Wi-Fi™. This more recently implemented wireless technology includes large-scale installation of WiFi™ base stations. In comparison to the conventional long-range cellular network technology as previously discussed, WiFi™ technology supports short-range communications such as around 200-300 meters as opposed to 1500 or more meters provided by cellular telephone base stations. In comparison to installation of cellular telephone towers, installation of WiFi™ base stations is substantially less expensive.

The wireless coverage in a vicinity of a respective WiFi™ base station is sometimes called a WiFi™ hot spot. As mentioned, wireless coverage provided by a WiFi™ base station is typically much smaller than wireless coverage provided by a corresponding long-range base station disposed on a cellular telephone tower.

When located within a WiFi™ hotspot, a mobile device operated by a corresponding user is able to establish a wireless communication link between the mobile device and the WiFi™ base station. Via communications over the wireless communication link, the mobile device has access to hardwired networks and is able to perform operations such as retrieve data from and transmit data to other resources (such as servers) in a network environment.

Conventional installation of a wireless access point (such as one or more WiFi™ base stations) at a particular geographical region typically requires the installer to take into account a number of installation factors. For example, assuming that the installer plans to communicatively couple a newly installed wireless access point directly to a physical network cable, the installer must consider where and how the newly installed wireless access point is going to be connected to an existing physical network cable. The installer may be limited to tapping into certain locations along the existing network cable where the newly installed wireless access point can be attached.

It should be noted that wireless coverage provided by a respective wireless access point can be limited for any number of reasons. For example, a geographical region may include any number of RF-blocking obstacles such as buildings, trees, etc., that potentially block wireless signals from reaching prospective targets. Thus, when installing a respective wireless access point, in order to provide good wireless coverage to users in the geographical region, the installer may also take into account where a majority of respective users will likely operate their mobile devices within the geographical region to provide optimal wireless coverage to such users, avoiding interference by the RF-blocking obstacles to the extent possible.

BRIEF DESCRIPTION OF EMBODIMENTS

Conventional techniques of installing one or more wireless access point in each of multiple geographical regions suffer from deficiencies. For example, it may be known that a large number of mobile device users typically frequent a particular geographical region based on collected mobile device usage information. In such an instance, as discussed above, an installer may dispatch a technician to install one or more wireless access point in such regions. However, installation of new wireless access points in high traffic areas does not always ensure that a respective service provider funding the installations will financially benefit from installations.

Embodiments herein deviate with respect to conventional techniques. For example, embodiments herein include novel ways of analyzing and determining whether it is desirable to install a respective wireless access point in each of many possible geographical regions.

More specifically, in accordance with one embodiment, an analyzer resource receives density information indicating an amount of mobile device usage in each of multiple geographical regions. The analyzer resource further receives resource information indicating locations of physical network resources available to support installation of wireless access points in the geographical regions and the location of any existing wireless access points already installed. The analyzer resource utilizes a combination of the density information and the resource information to produce a respective metric for each of the multiple geographical regions. In one embodiment, the respective metric for a corresponding geographical region indicates a desirability of installing a respective new wireless access point in the corresponding geographical region.

Assume further in this example embodiment that the analyzer resource produces an installation metric for each of multiple geographical regions. For example, assume that the analyzer resource produces: a first installation metric indicating a respective financial value associated with installing a new wireless access point in a first candidate geographical region, a second installation metric indicating a respective financial value associated with installing a new wireless access point in a second candidate geographical region, a third installation metric indicating a respective financial value associated with installing a new wireless access point in a third candidate geographical region, and so on.

Each installation metric for a respective geographical region can be a numerical value. In one embodiment, a magnitude of the numerical value indicates a degree to which it is desirable (or not) to install a new wireless access point in the corresponding geographical region to which the numerical value pertains. In accordance with further more embodiments, a respective installation metric can be configured to take into account: i) anticipated subscription revenue to be received from subscribers operating mobile devices in the corresponding geographical region, and ii) an estimated costs of installing a respective wireless access point in the corresponding geographical region. Thus, each generated installation metric for a corresponding geographical region can represent an overall value taking into account costs of installation (outflow of capital) as well as revenues (inflow of capital) expected to be received from subscribers Further embodiments herein include producing a map including one or more geographical regions of interest including a rendition of the first candidate geographical region, the second candidate geographical region, the third candidate geographical region, and so on.

Each of the different geographical regions included in the map can be configured to provide a respective visual indication indicating a value of a generated metric (installation metric). As previously mentioned, the metric can be configured to represent a degree of desirability associated with installation of a respective new wireless access point in the corresponding geographical region. Any suitable markings on the map can be used to indicate a setting of the installation metric generated for the corresponding geographical region.

As a specific non-limiting example embodiment, a first geographical region displayed on the map can be highlighted with a first color corresponding to a magnitude of the installation metric generated for the first geographical region; a second geographical region displayed on the map can be highlighted with a second color corresponding to a magnitude of the installation metric generated for the second geographical region; a third geographical region displayed on the map can be highlighted with a third color corresponding to a magnitude of the installation metric generated for the third geographical region; and so on.

In accordance with yet more specific embodiments, the respective installation metric for each of the corresponding geographical regions can be configured to indicate a degree to which installation of the respective wireless access point by a wireless network service provider is anticipated to result in a financial gain to a service provider installing the one or more new wireless access points in the candidate geographical regions.

More specifically, the installation metric derived for a candidate geographical region can be configured to capture a return-on-investment value of installing a new wireless access point in the first candidate geographical region; the installation metric derived for a second candidate geographical region can be configured to capture a return-on-investment value of installing a new wireless access point in the second candidate geographical region; the installation metric derived for a third candidate geographical region can be configured to capture a return-on-investment value of installing a new wireless access point in the third candidate geographical region; and so on. In such an example embodiment, the visual indication associated with the first candidate geographical region on the map indicates a degree to which installation of a new wireless access point in the first candidate geographical region would be financially advantageous to a service provider; the visual indication associated with the second candidate geographical region on the map indicates a degree to which installation of a new wireless access point in the second candidate geographical region would be financially advantageous to the service provider; the visual indication associated with the third candidate geographical region on the map indicates a degree to which installation of a new wireless access point in the third candidate geographical region would be financially advantageous to the service provider; and so on.

In accordance with further embodiments, the generated map is a heat map. In such an instance, the visual indications are assigned a different color setting depending on a magnitude of a respective installation metric generated for the geographical region. For example, the color spectrum can include the colors red, orange, yellow, green, blue, indigo, and violet. The values of the respective generated installation metrics can be either positive or negative numbers depending upon whether installation of a respective wireless access point would result in a positive return-on-investment or a negative return-on-investment.

In further non-limiting example embodiments, geographical regions assigned near zero return-on-investment values are assigned a color of green (e.g., a middle of the color spectrum). Regions assigned highest positive return-on-investment values are assigned a color red; regions assigned a positive return-on-investment value between substantially above zero and up to the highest positive return-on-investment values are assigned a color (such as orange or yellow) between red and green depending on a magnitude of the installation metric. Regions colored red on the map are typically high traffic mobile device locations in which resources are easily available to install a respective wireless access point.

If further desired, in a similar manner, note that the negative valued metrics can be assigned a value between green and violet depending on their magnitude. For example, geographical regions assigned highest negative return-on-investment values can be assigned the color purple.

Embodiments herein are useful over conventional techniques because they provide unique ways of quickly assessing the financial value of installing a respective new wireless access point in a geographical region. For example, subsequent to analyzing the different geographical regions and relevant input parameters via an analyzer resource, a corresponding generated map indicates one or more locations of a region of interest (such as a city) where it is makes most financial sense to install a respective one or more new wireless access points.

These and other more specific embodiments are disclosed in more detail below.

Note that any of the resources as discussed herein can include one or more computerized devices, servers, base stations, wireless communication equipment, communication management systems, workstations, handheld or laptop computers, or the like to carry out and/or support any or all of the method operations disclosed herein. In other words, one or more computerized devices or processors can be programmed and/or configured to operate as explained herein to carry out different embodiments of the invention.

Yet other embodiments herein include software programs to perform the steps and operations summarized above and disclosed in detail below. One such embodiment comprises a computer program product including a non-transitory computer-readable storage medium (i.e., any physical computer readable hardware storage medium) on which software instructions are encoded for subsequent execution. The instructions, when executed in a computerized device (e.g., computer processing hardware) having a processor, program and/or cause the processor to perform the operations disclosed herein. Such arrangements are typically provided as software, code, instructions, and/or other data (e.g., data structures) arranged or encoded on a non-transitory computer readable storage medium such as an optical medium (e.g., CD-ROM), floppy disk, hard disk, memory stick, etc., or other a medium such as firmware or shortcode in one or more ROM, RAM, PROM, etc., or as an Application Specific Integrated Circuit (ASIC), etc. The software or firmware or other such configurations can be installed onto a computerized device to cause the computerized device to perform the techniques explained herein.

Accordingly, embodiments herein are directed to a method, system, computer program product, etc., that supports operations as discussed herein.

One or more embodiments herein include a computer readable storage medium and/or system having instructions stored thereon. The instructions, when executed by computer processor hardware, cause the computer processor hardware (such as in a mobile computer device) to: receive density information indicating an amount of mobile device usage in each of multiple geographical regions; receive resource information indicating locations of physical network resources available to support installation of wireless access points in the geographical regions; and utilize the density information and the resource information to produce a respective metric for each of the multiple geographical regions, the respective metric indicating a desirability of installing a respective wireless access point in a corresponding geographical region.

One or more embodiments herein include a computer readable storage medium and/or system having instructions stored thereon. The instructions, when executed by computer processor hardware, cause the computer processor hardware to: produce a first installation metric, the first installation metric indicating a respective value associated with installing a wireless access point in a first candidate geographical region; produce a second installation metric, the second installation metric indicating a respective value associated with installing a wireless access point in a second geographical region; and produce a map including the first candidate geographical region and the second candidate geographical region, the map providing a visual indication that the first installation metric has been assigned to the first candidate geographical region and that the second installation metric has been assigned to the second candidate geographical region.

The ordering of the operations above has been added for clarity sake. Note that any of the processing steps as discussed herein can be performed in any suitable order.

Other embodiments of the present disclosure include software programs and/or respective hardware to perform any of the method embodiment steps and operations summarized above and disclosed in detail below.

It is to be understood that the system, method, apparatus, instructions on computer readable storage media, etc., as discussed herein also can be embodied strictly as a software program, firmware, as a hybrid of software, hardware and/or firmware, or as hardware alone such as within a processor, or within an operating system or a within a software application.

As discussed herein, techniques herein are well suited for facilitating installation of corresponding wireless access points in a network environment. However, it should be noted that embodiments herein are not limited to use in such applications and that the techniques discussed herein are well suited for other applications as well.

Additionally, note that although each of the different features, techniques, configurations, etc., herein may be discussed in different places of this disclosure, it is intended, where suitable, that each of the concepts can optionally be executed independently of each other or in combination with each other. Accordingly, the one or more present inventions as described herein can be embodied and viewed in many different ways.

Also, note that this preliminary discussion of embodiments herein purposefully does not specify every embodiment and/or incrementally novel aspect of the present disclosure or claimed invention(s). Instead, this brief description only presents general embodiments and corresponding points of novelty over conventional techniques. For additional details and/or possible perspectives (permutations) of the invention(s), the reader is directed to the Detailed Description section and corresponding figures of the present disclosure as further discussed below.

Figure 1:
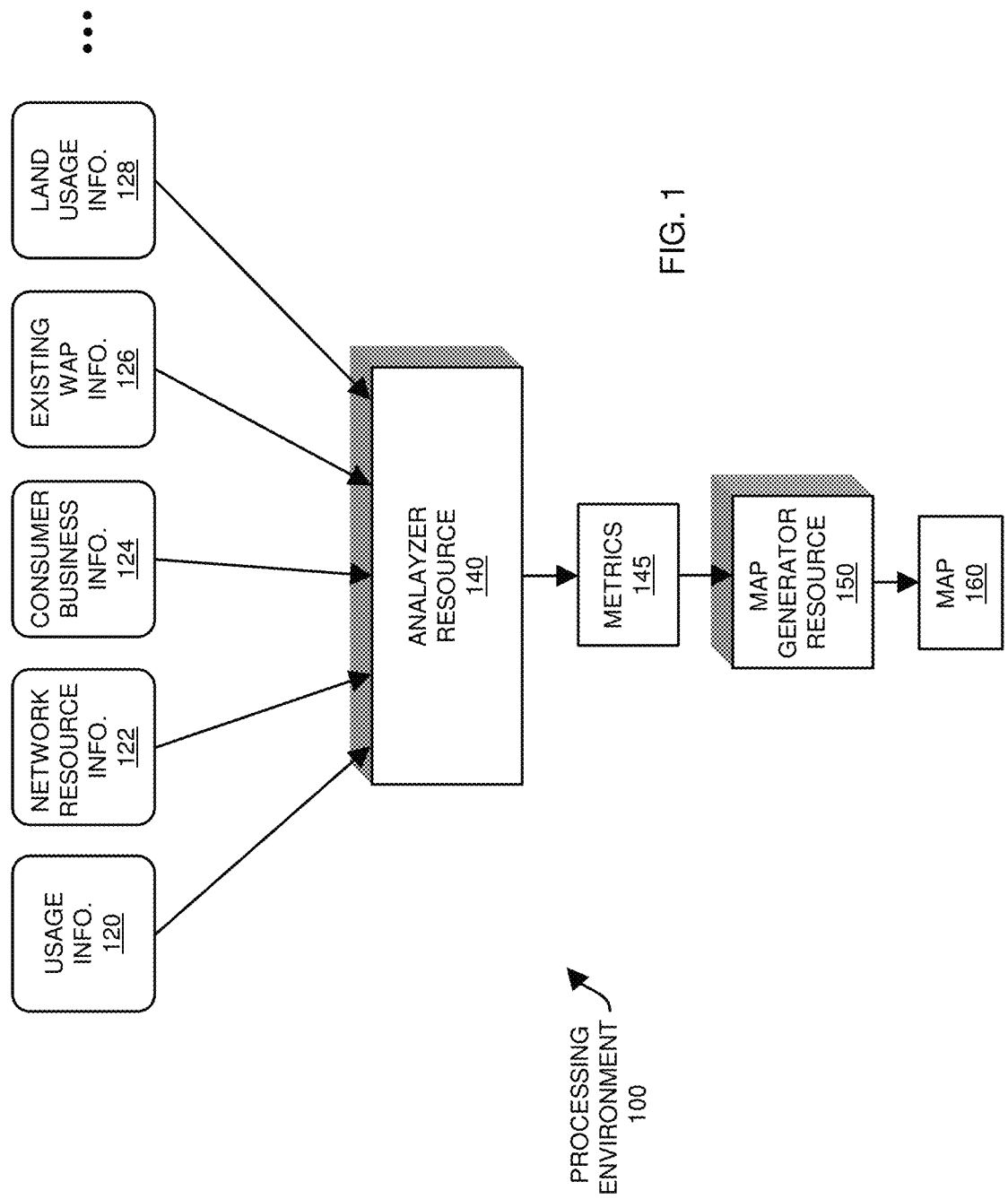
FIG. 1 is an example diagram illustrating generation of metrics and map information according to embodiments herein.

The foregoing and other objects, features, and advantages of the invention will be apparent from the following more particular description of preferred embodiments herein, as illustrated in the accompanying drawings in which like reference characters refer to the same parts throughout the different views. The drawings are not necessarily to scale, with emphasis instead being placed upon illustrating the embodiments, principles, concepts, etc.

DETAILED DESCRIPTION AND FURTHER SUMMARY OF EMBODIMENTS

Now, more specifically, FIG. 1 is an example diagram illustrating processing of information to produce metrics and one or more respective maps according to embodiments herein. As further shown below, embodiments herein include novel ways of analyzing, determining, and providing notification whether it is desirable to install a respective wireless access point in each of multiple candidate geographical regions.

Processing environment 100 in FIG. 1 includes analyzer resource 140 as well as map generator resource 150. In this example embodiment, analyzer resource 140 receives information such as usage information 120, network resource information 122, consumer business information 124, existing wireless access point information 126, land usage information 128, etc.

In one embodiment, usage information 120 specifies a density of unique outdoor mobile device users that frequent a particular geographical region. In other words, the usage information indicates how many unique outdoor mobile device users are present in each of multiple different geographical regions. As described herein, geographical regions with a high density of mobile device users are typically good candidates to install a respective one or more new wireless access point if one does not already exist and other conditions are met as determined by these embodiments.

Further in this example embodiment, consumer business information 124 specifies locations of different businesses (such as customer-visited businesses) such as coffee shops, retail outlets, etc., that are likely to attract mobile device users. A presence of one or more businesses in a particular area may also indicate that the area is a good candidate for installation of a respective new wireless access point if one does not already exist in such a region.

As its name suggests, land usage information 128 specifies additional geographical regions or landmarks where it is likely that mobile device users will be present. For example, usage information 126 can be evaluated in locations such as parks, landmarks, rest areas, scenic views, etc., where a high number of mobile device users are likely to be present.

Any combination of the usage information 120, consumer business information 124, land usage information 128, etc., can be used to identify particular regions where it may be beneficial to install a respective new wireless access point based on a presence of high numbers of mobile device users above a threshold value.

Further in this example embodiment, note that existing wireless access point information 126 indicates the locations of currently installed outdoor wireless access points. If desired, these locations can be ignored when performing an installation analysis because one or more wireless access points already exist in such regions.

As previously mentioned, analyzer resource 140 also can be configured to receive network resource information 122. In one non-limiting example embodiment, the network resource information 122 indicates locations where existing infrastructure facilitates installation of a corresponding new wireless access point. For example, the network resource information 122 can indicate locations of resources such as so-called aerial strands between telephone poles (or telephone poles or other suitable structures) where a corresponding physical network cable is available to easily install a corresponding new wireless access point. The existing physical network cable provides connectivity to a network such as the Internet.

In addition to indicating locations of above ground resources, note that the network resource information 122 can indicate locations of additional resources such as underground network cables that are available to install wireless access points. Knowing the locations of available network resources facilitating installation of the new wireless access points is useful during analysis because certain geographical regions can be dismissed if appropriate resources are not easily available in a particular geographical region. In other words, if a corresponding geographical region is more than a few hundred feet away from a nearest physical network cable, the corresponding geographical region may be dismissed as a candidate for installing a new wireless access point because installation costs would be prohibitive.

Via processing of the different types of received information (such as usage information 120, network resource information 122, etc.), the analyzer resource 140 produces a metric for each of multiple geographical regions.

As mentioned, in one non-limiting example embodiment, a respective generated metric for a corresponding geographical region indicates whether or not it is desirable to install a respective wireless access point in the corresponding geographical region.

In accordance with further embodiments, map generator resource 150 utilizes the generated metrics 145 to produce a respective map 160. In one embodiment, as further discussed below, the map 160 can include a rendition of each of multiple geographical regions. Using the metrics 145, the map generator resource 150 initiates display of a corresponding visual indicator for each of the geographical regions. For example, the corresponding visual indicator for a respective geographical region indicates whether it is desirable or not to install a respective wireless access point in the geographical region. Thus, via review of the map on display media such as a display screen, paper, etc., a reviewer is able to quickly identify optimal locations to install new wireless access points.

Figure 2:
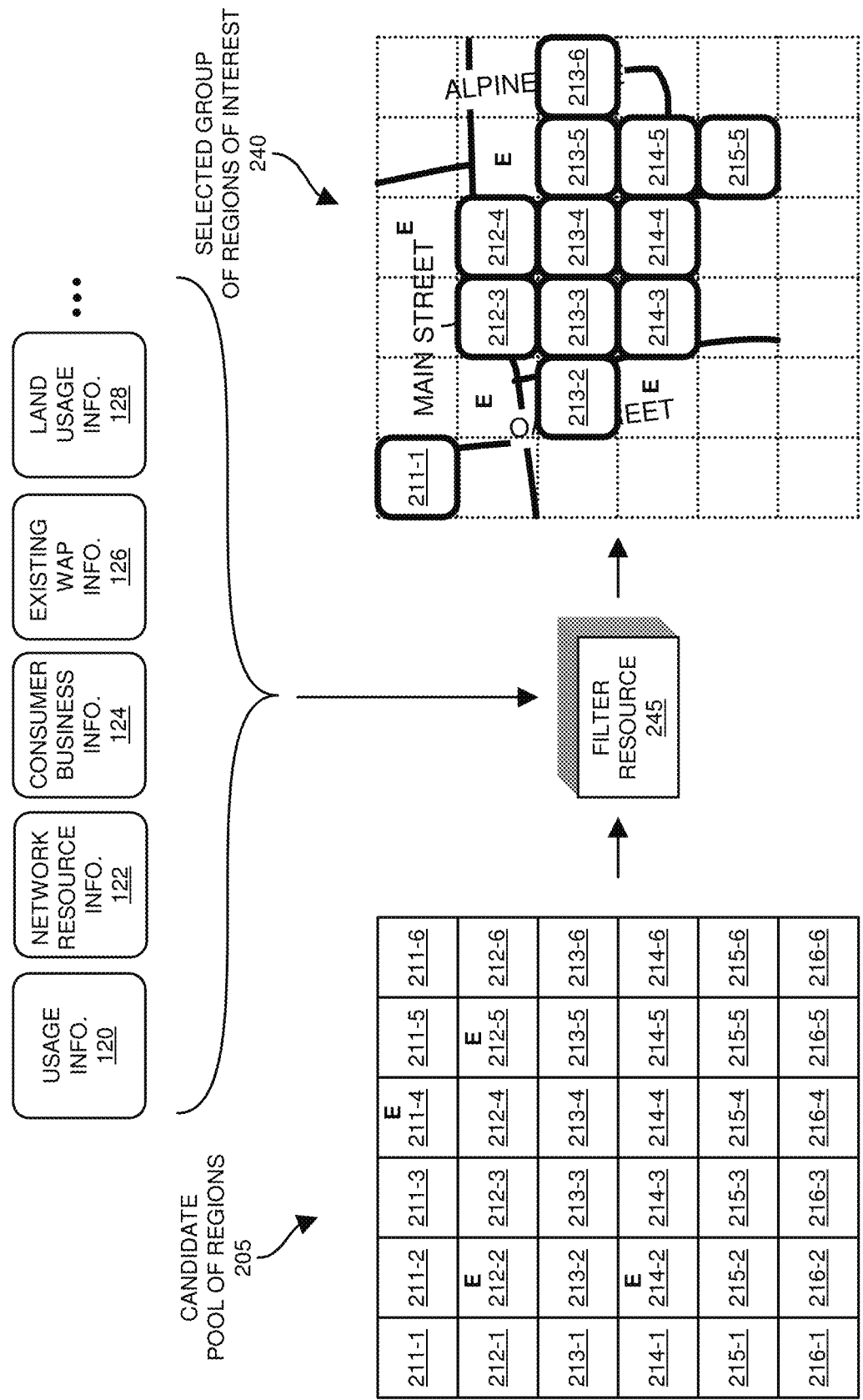
FIG. 2 is an example diagram illustrating parsing and analysis of a region of interest to identify candidate geographical regions for installation of respective one or more wireless access points according to embodiments herein.

FIG. 2 is an example diagram illustrating parsing and analysis of a region of interest to identify candidate geographical regions for installation of respective wireless access points according to embodiments herein.

Assume in this example embodiment that a user selects a particular region of interest (such as a city) to analyze whether it is desirable to install one or more corresponding new wireless access points (such as WiFi™ base stations).

In response to receiving a parameter specifying a region of interest, the analyzer resource 140, subdivides the specified region of interest into a candidate pool of regions 205 (or analytic units) including geographical region 211-1, geographical region 211-2, geographical region 211-3, geographical region 211-4, geographical region 211-5, geographical region 211-6, geographical region 212-1, geographical region 212-2, geographical region 212-3, geographical region 212-4, geographical region 212-5, geographical region 212-6, geographical region 213-1, geographical region 213-2, geographical region 213-3, geographical region 213-4, geographical region 213-5, geographical region 213-6, geographical region 214-1, geographical region 214-2, geographical region 214-3, geographical region 214-4, geographical region 214-5, geographical region 214-6, geographical region 215-1, geographical region 215-2, geographical region 215-3, geographical region 215-4, geographical region 215-5, geographical region 215-6, geographical region 216-1, geographical region 216-2, geographical region 216-3, geographical region 216-4, geographical region 216-5, and geographical region 216-6.

Note that although the region of interest is subdivided into square partitions in this non-limiting example embodiment, each of the geographical regions can be of any suitable shape such as octagon, circle, etc.

The geographical regions can be selected to be of any suitable size. For example, in one non-limiting example embodiment, each of the geographical regions is of approximately equal size such as around 328 square feet of area (100 meters×100 meters). In most cases, a single base station (wireless access point) installed in a respective geographical region supports full wireless coverage to any mobile device users that happen to be in the geographical region.

Embodiments herein include the discovery that some of the geographical regions residing in the candidate pool of regions 205 may not be good candidates to install a respective new wireless access point.

For example, usage information 120 may indicate that very few mobile device users frequent a particular geographical region. In such an instance, for any geographical regions in which the number of mobile device users is below a threshold density value, the filter resource 245 (associated with analyzer resource 140) eliminates such corresponding geographical regions from consideration.

Assume in this example embodiment that a combination of the usage information 120, consumer business information 124, and/or land usage information 126 indicates that the following geographical regions have a sufficiently low number of mobile device users present in a respective region such that the geographical regions do not warrant installation of a new wireless access point: geographical region 211-2, geographical region 211-3, geographical region 211-5, geographical region 211-6, geographical region 212-1, geographical region 212-6, geographical region 213-1, geographical region 214-1, geographical region 214-6, geographical region 215-1, geographical region 215-2, geographical region 215-3, geographical region 215-4, geographical region 215-6, geographical region 216-1, geographical region 216-2, geographical region 216-3, geographical region 216-4, geographical region 216-5, and geographical region 216-6. In such an instance, the filter resource 245 removes these geographical regions from a candidate list. Thus, selection of the multiple geographical regions from the candidate pool of regions 205 can include utilizing the mobile device user density information as specified by the usage information 120 as well as other information such as consumer business information 124, land usage information 128, etc., to identify which of the regions in the candidate pool are of interest because they are frequented (or most likely frequented) by more than a threshold number of mobile device users Assume further in this example embodiment that existing wireless access point information 128 indicates that geographical region 211-4, geographical region 212-2, geographical region 212-5, and geographical region 214-2 all have a currently installed one or more wireless access point to serve a respective geographical region. As shown in this example, each of the regions in which a wireless access point already exists includes a marking with a letter E (Existing). In such an instance, the filter resource 245 removes these geographical regions marked with the letter E from the candidate list. More specifically, in one non-limiting example embodiment, because it is known that a wireless access point exists in each of the geographical regions 211-4, 212-2, 212-5, and 214-2, there is no need to perform a return-on-investment analysis whether to install a new wireless access point in such regions. Thus, selection of multiple regions from the candidate pool of regions 205 (to produce selected group 240) can include filtering out geographical regions of the candidate pool 205 in which an access point resource is already installed. In accordance with further embodiments, via existing wireless access point information 126, the analyzer resource 140 as described herein keeps track of the regions where wireless access points already exist. As further discussed later in this specification such as in FIG. 7, the map manager 150 can be configured to provide a visual indication on a respective generated map 160 to utilize existing wireless access point information 126 (indicating locations of existing wireless access points and corresponding regions) to indicate geographical regions in which a respective wireless access point is already installed.

Referring again to FIG. 2, note that further embodiments herein can include utilizing the network resource information 120 to identify which of the regions in the candidate pool resides within a threshold distance of a corresponding physical network resource available to support installation of a respective wireless access point. As specified by the network resource information 122, if no network infrastructure is available (within a threshold distance such as 500 feet) in a corresponding geographical region to install a new wireless access point, the filter resource 245 can be configured to exclude the candidate geographical region from inclusion in the group of selected geographical regions of interest 240.

Accordingly, via application of the different types of information including usage information 120, consumer business information 124, and usage information 126, and existing wireless access point information 128, etc., the filter resource 245 selects a group of geographical regions of interest 240.

As shown in this example, the group of geographical regions of interest 240 includes geographical region 211-1, geographical region 212-3, geographical region 212-4, geographical region 213-2, geographical region 213-3, geographical region 213-4, geographical region 213-5, geographical region 213-6, geographical region 214-3, geographical region 214-4, geographical region 214-5, and geographical region 215-5.

Figure 3:
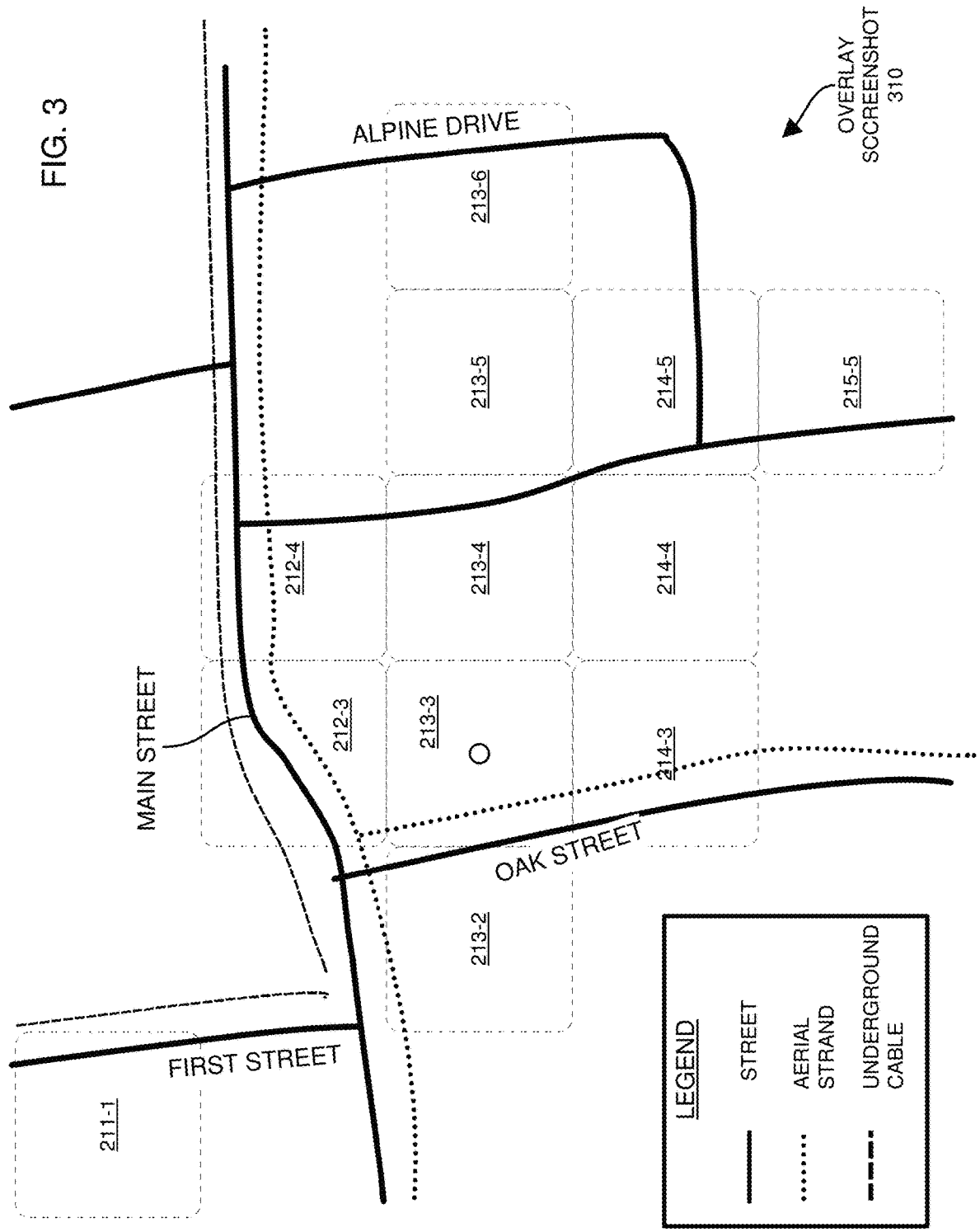
FIG. 3 is an example diagram illustrating an overlay specifying available network resources with respect to candidate geographical regions according to embodiments herein

FIG. 3 is an example diagram illustrating an overlay of available network resources with respect to candidate geographical regions according to embodiments herein.

In one embodiment, the network resource information 122 includes a map of network resources (e.g., aerial strands, underground cables, telephone poles, etc.) that are available to facilitate installation of a respective new wireless access point. As its name suggests, overlay screenshot 310 includes the group of geographical regions of interest 240 overlaid onto a map of the available network resources.

Via overlay screenshot 310, the analyzer resource 140 is able to identify a nearness of centroids (or other proposed installation location) of the geographical regions of interest to corresponding network infrastructure facilitating installation of a corresponding new wireless access point.

Figure 4:
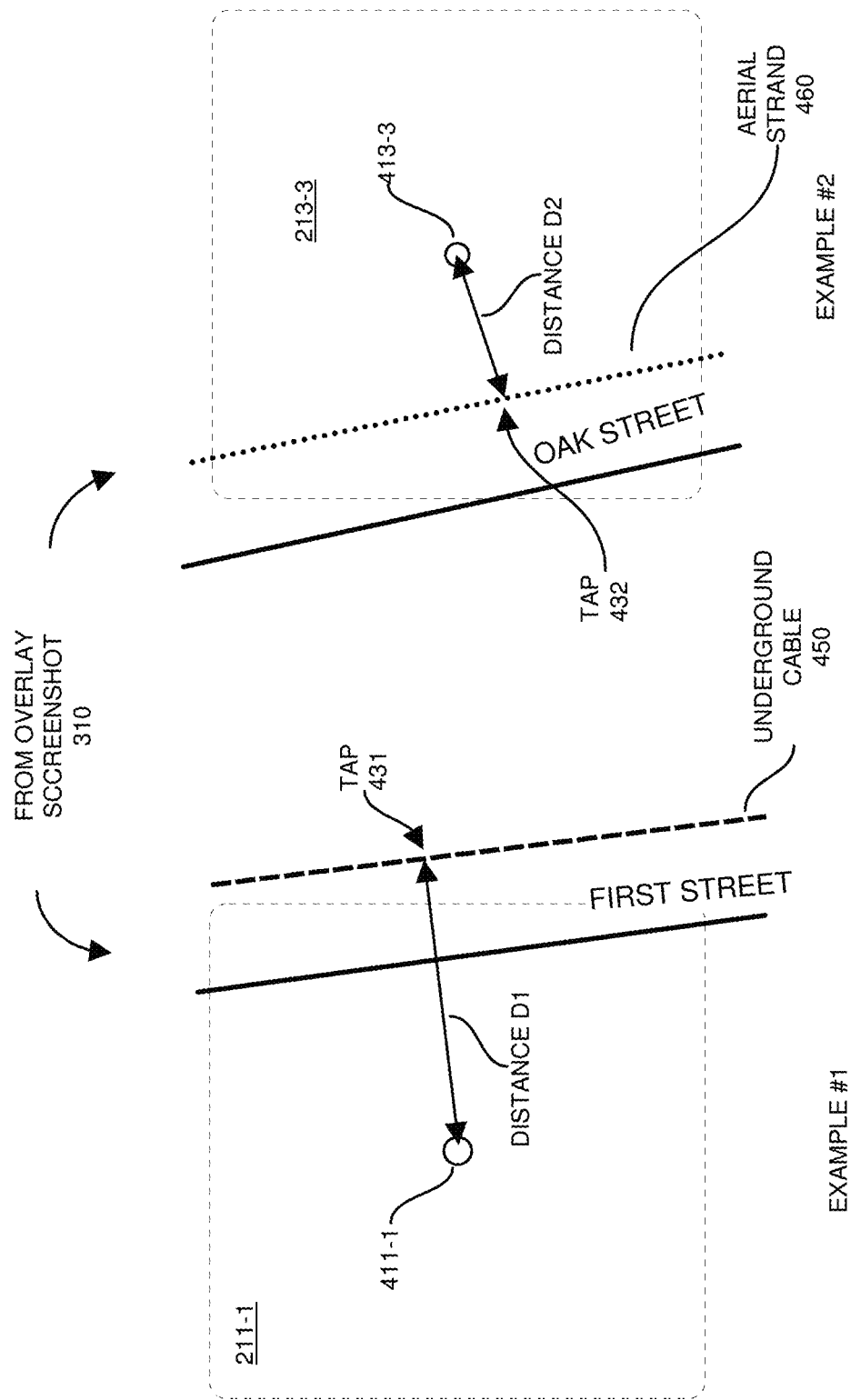
FIG. 4 is an example diagram illustrating analysis of existing network infrastructure in a corresponding geographical region to estimate a cost of installing a respective wireless access point in the corresponding geographical region according to embodiments herein.

FIG. 4 is an example diagram illustrating analysis of existing network infrastructure in a corresponding geographical region to estimate a cost of installing a respective wireless access point in the corresponding geographical region according to embodiments herein.

As mentioned, one factor to consider whether it is worthwhile to install a corresponding new wireless access point in a geographical region is the cost of installing the wireless access point in the geographical region. As further shown in FIG. 4 (zoom in of FIG. 3), embodiments herein can include analyzing a distance between a corresponding centroid (or other location) of the geographical region and available network resources in order to estimate a cost of installing a corresponding wireless access point in the geographical region.

In general, the longer the distance between a centroid of a respective geographical region and available network tap, the higher the costs of installation. Conversely, the shorter the distance between a centroid of a respective geographical region and available network tap, the lower the costs of installation.

In the example #1 in FIG. 4, the analyzer resource 140 determines that centroid 411-1 (such as a proposed location of a first wireless access point) associated with geographical region 211-1 is a distance, D1, from nearest available network access tap 431 along underground cable 450. In one embodiment, in addition to specifying the presence of the underground cable 450, note that the network resource information 122 can specify which locations along the respective continuum are available to tap into a respective underground cable 450. Thus, the tap 431 may be one point amongst multiple points on a service provider's underground cable 450 to facilitate installation of a new wireless access point.

In this example embodiment, the analyzer resource 140 utilizes the calculated distance, D1 (from centroid 411-1 to tap 431), to estimate how much it will cost to install a new wireless access point at or near centroid 411-1 in geographical region 211-1. Thus, the analyzer resource's estimated cost of installing a new wireless access point in the candidate geographical region 211-1 can take into account a distance between: i) a location of a resource (such as tap 431) providing network access, and ii) a location (such as centroid 411-1) of the wireless access point to be installed in the geographical region 211-1. Based at least in part on the distance information (D1) and possibly other installation factors such as unique characteristics of the location of the geographical region in the country, the analyzer resource 140 generates a numerical value that will be used later to generate an installation metric for geographical region 211-1.

In the example #2 in FIG. 4, the analyzer resource 140 determines that a proposed location of a second wireless access point such as centroid 413-3 associated with geographical region 213-3 is a distance, D2, from available network access tap 432 disposed on aerial strand 460 (e.g., a strand including a network cable between two telephone poles). In one embodiment, in addition to specifying the presence of the aerial strand 460, the network resource information 122 can specify which locations along the respective continuum of aerial strand 460 are available to tap a respective service provider's network. The analyzer resource 140 utilizes the calculated distance, D2 (such as shortest distance), to estimate how much it will cost to install a new wireless access point at or near centroid 413-3 in geographical region 213-3.

Thus, the analyzer resource's estimated cost of installing a new wireless access point in the candidate geographical region 213-3 can take into account a distance between: i) a location of a resource (such as tap 432) providing network access, and ii) a location (such as centroid 413-3) of the wireless access point to be installed in the geographical region 213-3.

In a similar manner, the analyzer resource 140 can be configured to use overlay screenshot 310 to estimate a respective cost of installing a new wireless access point in each of the geographical regions. In candidate geographical regions where multiple different types of resources such as both aerial strand and underground network resources exist, the analyzer resource 140 evaluates the distance to the different types of available network resources and estimates the least cost of installing a new wireless access point. Thus, in one embodiment, for each candidate geographical region, the analyzer resource 140 identifies the network resource type (such as an aerial strand, underground cable, etc.) that supports the least cost of installing a new wireless access point in that geographical region.

Figure 5:
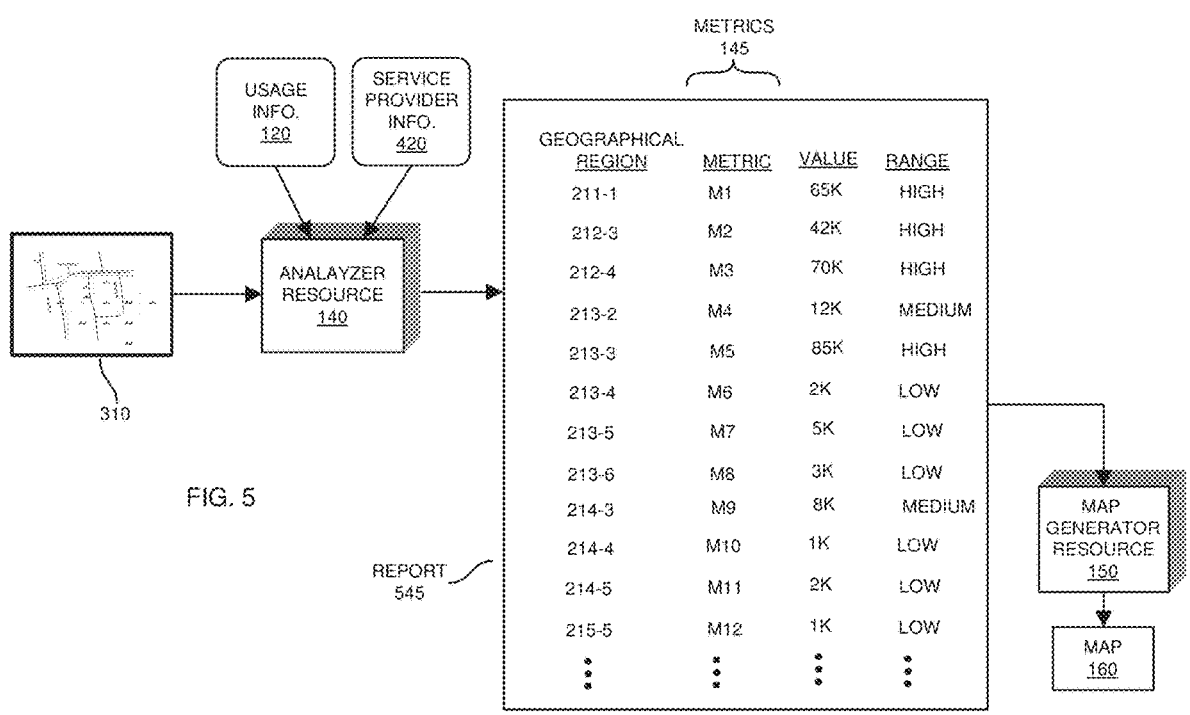
FIG. 5 is an example diagram illustrating generation of a respective installation metric for each of multiple geographical regions according to embodiments herein.

FIG. 5 is an example diagram illustrating generation of a respective installation metric for each of multiple geographical regions according to embodiments herein.

As previously discussed, the analyzer resource 140 generates a respective metric for each of the geographical regions of interest as shown in report 545. In this example embodiment, the analyzer resource 140 generates metric M1 for geographical region 211-1; the analyzer resource 140 generates metric M2 for geographical region 212-3; the analyzer resource 140 generates metric M3 for geographical region 212-4; the analyzer resource 140 generates metric M4 for geographical region 213-2; the analyzer resource 140 generates metric M5 for geographical region 213-3; the analyzer resource 140 generates metric M6 for geographical region 213-4; the analyzer resource 140 generates metric M7 for geographical region 213-5; the analyzer resource 140 generates metric M8 for geographical region 213-6; the analyzer resource 140 generates metric M9 for geographical region 214-3; the analyzer resource 140 generates metric M10 for geographical region 214-4; the analyzer resource 140 generates metric M11 for geographical region 214-5; the analyzer resource 140 generates metric M12 for geographical region 215-5; and so on.

In one embodiment, when generating a respective metric for a corresponding geographical region, the analyzer resource 140 takes into account a number of parameters such as i) an anticipated costs of installing a respective wireless access point in the corresponding geographical region (which may be based on distance as discussed above) and ii) estimated revenues that are anticipated to be generated by installation of the respective wireless access point in the corresponding geographical region. In such an instance, each of the metrics represents a balance between costs of installing and/or maintaining a respective wireless access point in a geographical region and expected returned revenues for the wireless access point.

In one non-limiting example embodiment, each of the generated metrics 145 represent an estimated value (such as a financial value) associated with installing a wireless access point in a geographical region. More specifically, metric M1 indicates a respective value associated with installing a wireless access point in geographical region 211-1; metric M2 indicates a respective value associated with installation of a respective wireless access point in geographical region 212-3; metric M3 indicates a respective value associated with installation of a respective wireless access point in geographical region 212-4; and so on.

In further example embodiments, each of the generated metrics represents an expected return-on-investment for installing a wireless access point in a given geographical region. A respective magnitude of the metrics 145 indicates geographical regions in which it is most beneficial to install a respective new wireless access point.

Subsequent to generating report 545, the map generator resource 150 is able to generate a respective map 160 including each of the geographical regions. In one embodiment, when generating a respective map 160, the map generator resource 150 provides a visual indication on map 160 that the first geographical region 211-1 has been assigned the first metric M1; the map generator resource 150 provides a visual indication on map 160 that the second geographical region 212-3 has been assigned the second metric M2; the map generator resource 150 provides a visual indication on map 160 that the third geographical region 212-4 has been assigned the third metric M3; and so on.

As further shown, an installation metric for a respective geographical region can be a numerical value. In one embodiment, a magnitude of the numerical value indicates a degree to which it is desirable or not to install the corresponding geographical region to which the numerical value pertains. For example, a respective installation metric, M, can be configured to take into account: i) anticipated subscription revenue to be received from or associated with subscribers operating mobile devices in the corresponding geographical region, and ii) estimated costs of installing a respective wireless access point in the corresponding geographical region. Each generated installation metric can represent an overall value taking into account costs of installation (outflow of capital) as well as revenues (inflow of capital) expected to be received from subscribers that operate respective mobile devices in a geographical region.

As a more specific non-limiting example, the analyzer resource 140 can be configured to generate a respective metric for each geographical region based on the following equation:

$$\text{metric } Mx(\text{Net Value}) = (\text{ARPU} * \text{LIFE} * \text{MUC} * \text{TPEN} * \text{TAKE}) - \text{COST};$$

where:
ARPU=monthly subscriber revenue per user (varies depending on market),
LIFE=average number of months that a subscriber subscribes to a respective service provider's data delivery services,
MUC=estimated average quantity of outdoor mobile device users per month in a corresponding geographical region, (based on: usage information 120 indicating a density of mobile device users in a respective geographical region),
TPEN=percentage of mobile device users in the corresponding geographical region that subscribe to service provider's data delivery services (such as high speed data service over a physical cable network environment), the service provider may offer the use of service in regions outside of one's subscriber domain
TAKE=percentage of service provider's subscribers that would use services provided by wireless access points in the corresponding geographical region,
COST=outflow of expenses to cover cost of installation of new wireless access point, this can include expenses such as equipment cost, utility pole rental fees, cost to install the wireless access point by a technician, maintenance fees associated with wireless access point over time, etc.

In one embodiment, the first portion (such as ARPU*LIFE*MUC*TPEN*TAKE) of the above equation represents or includes an estimated subscription revenue from (or value associated with) a set of subscribers anticipated to use a new wireless access point installed in a respective candidate geographical region. As mentioned, the second portion (COST) represents a cost of installing and/or maintaining the wireless access point in the respective candidate geographical region.

Generation of Metric M1

In one embodiment, to generate the metric M1, assume that the analyzer resource 140 derives and/or receives the following information for geographical region 211-1:
ARPU=$40 per month,
LIFE=20 months,
MUC=1171 mobile device users,
TPEN=40%,
TAKE=20%,
COST (based on D1=5 meters), estimated cost of installation of new wireless access point=10K.

Based on the above equation, the analyzer resource 140 produces a net asset value of 65K (such as $65,000) for metric M1.

Generation of Metric M2

Assume that the analyzer resource 140 derives and/or receives the following information for geographical region 212-3:
ARPU=$30 per month,
LIFE=10 months,
MUC=7444 mobile device users,
TPEN=30%,
TAKE=10%,
COST=estimated cost of installation of new wireless access point=25K.

Based on the above equation, the analyzer resource 140 produces a net asset value of 42K (such as $42,000) for metric M2.

Generation of Metric M3

Assume that the analyzer resource 140 derives and/or receives the following information for geographical region 212-4:
ARPU=$30 per month,
LIFE=20 months,
MUC=4722 mobile device users,
TPEN=30%,
TAKE=10%,
COST=estimated cost of installation of new wireless access point=15K.

Based on the above equation, the analyzer resource 140 produces a net asset value of 70K (such as $70,000) for metric M3.

Generation of Metric M4

Assume that the analyzer resource 140 derives and/or receives the following information for geographical region 213-2:
ARPU=$30 per month,
LIFE=20 months,
MUC=944 mobile device users,
TPEN=30%,
TAKE=10%,
COST=estimated cost of installation of new wireless access point=5K.

Based on the above equation, the analyzer resource 140 produces a net asset value of 12K (such as $12,000) for metric M2.

Generation of Metric M5

Assume that the analyzer resource 140 derives and/or receives the following information for geographical region 213-3:
ARPU=$40 per month,
LIFE=20 months,
MUC=1171 mobile device users,
TPEN=40%,
TAKE=20%,
COST (based on D1=5 meters), estimated cost of installation of new wireless access point=10K.

Based on the above equation, the analyzer resource 140 produces a net asset value of 85K (such as $85,000) for metric M5.

In a similar manner, the analyzer resource 140 generates a respective metric for each geographical region.

In accordance with further embodiments, each of the geographical regions can be tagged as being a candidate for installation of an aerial wireless access point (in which the proposed wireless access point would be installed on an aerial resource) or an attached wireless access point (in which the proposed wireless access point would be installed to an underground cable). In such an instance, the analyzer resource 140 can be configured to generate so-called total wireless access point build information (such as output data in addition to the metrics 145) to include:
Quantity of aerial-type WAPs (Wireless Access Points to aerial locations such as on wires/cables between telephone poles) and total net value of all aerial-type WAPs Quantity of attached WAPs and total value of attached WAPs (access points connected to underground cables)

Total quantity of all WAPs and corresponding total net value

Figure 6:
FIG. 6 is an example map diagram illustrating return-on-investment values associated with installation of new wireless access points in different geographical regions according to embodiments herein.

FIG. 6 is an example map diagram illustrating a map that displays return-on-investment values associated with installation of new wireless access points in different geographical regions according to embodiments herein.

In this non-limiting example embodiment, the map generator resource 150 utilizes magnitudes of the generated metrics to produce a respective map 160. Attributes of the visual indication associated with the different geographical regions of the map 160 vary depending on a numerical range in which they reside. For example, in one embodiment, geographical regions assigned a net value greater than 40K (i.e., 40,000) are shaded with a darkest shading (see legend in FIG. 6); geographical regions assigned a net value between 5K (i.e., 5,000) and 40K (i.e., 40,000) are shaded with a medium degree of shading; and geographical regions assigned a net value between 0 and 5K (i.e., 5000) are shaded with a lightest degree of shading.

As previously discussed, the analyzer resource 140 generated a value of 65,000 for metric M1 associated with geographical region 211-1. Because the magnitude of the value assigned to metric M1 is greater than 40K, the map generator resource 150 shades the geographical region 211-1 on map 160 with a dark shading (or color red).

The analyzer resource 140 generates a value of 42,000 for metric M2 associated with geographical region 212-3. Because the magnitude of the value assigned to metric M2 is greater than 40K, the map generator resource 150 shades the geographical region 212-3 on map 160 with a dark shading (or color red).

The analyzer resource 140 generates a value of 70K for metric M3 associated with geographical region 212-4. Because the magnitude of the value assigned to metric M3 is greater than 40K, the map generator resource 150 shades the geographical region 212-4 on map 160 with a dark shading.

The analyzer resource 140 generates a value of 12K for metric M4 associated with geographical region 213-2. Because the magnitude of the value assigned to metric M4 is between 5K and 20K, the map generator resource 150 shades the geographical region 213-2 on map 160 with medium shading (or orange or yellow).

The analyzer resource 140 generates a value of 85K for metric M5 associated with geographical region 213-3. Because the magnitude of the value assigned to metric M5 is greater than 40K, the map generator resource 150 shades the geographical region 212-3 on map 160 with a dark shading.

The analyzer resource 140 generates a value of 2K for metric M6 associated with geographical region 213-4. Because the magnitude of the value assigned to metric M6 is between zero and 5K, the map generator resource 150 shades the geographical region 213-4 on map 160 with light shading (such as yellow or green).

In this manner, the map generator resource 150 generates different shading depending on a magnitude of value for each metric. The map generator resource 150 displays the geographical regions with different identified shading as shown in map 160 of FIG. 6.

Thus, via shading the geographical region 211-1 in map 160 with a darkest shade, the map generator resource 150 provides a visual indication to a reviewer that installation of a new wireless access point in the geographical region 211-1 has a high return-on-investment value; via shading the geographical region 212-3 in map 160 with a darkest shade, the map generator resource 150 provides a visual indication to a reviewer that installation of a new wireless access point in the geographical region 212-3 has a high return-on-investment value; via shading the geographical region 212-4 in map 160 with a darkest shade, the map generator resource 150 provides a visual indication to a reviewer that installation of a new wireless access point in the geographical region 212-4 has a high return-on-investment value; via shading the geographical region 213-2 in map 160 with a medium shade, the map generator resource 150 provides a visual indication to a reviewer that installation of a new wireless access point in the geographical region 213-2 has a medium return-on-investment value; via shading the geographical region 213-3 in map 160 with a darkest shade, the map generator resource 150 provides a visual indication to a reviewer that installation of a new wireless access point in the geographical region 213-3 has a high return-on-investment value; via shading the geographical region 213-4 in map 160 with a lesser degree of shading (light shading), the map generator resource 150 provides a visual indication to a reviewer that installation of a new wireless access point in the geographical region 213-4 has a low (but positive) return-on-investment value; via shading the geographical region 213-5 in map 160 with a lesser degree of shading, the map generator resource 150 provides a visual indication to a reviewer that installation of a new wireless access point in the geographical region 213-5 has a low (positive) return-on-investment value; and so on.

Note that map generator resource 150 can be configured to display any suitable type of visual indication. For example, if desired, the map generator resource 150 can be configured to display the metric in each corresponding geographical region to indicate a net asset value associated with installation of a new wireless access point. As a more specific example, the map generator resource 150 can be configured to display the value 65K in geographical region 211-1; the map generator resource 150 can be configured to display the value 42K in geographical region 212-3; the map generator resource 150 can be configured to display the value 70K in geographical region 212-4; and so on.

Figure 7:
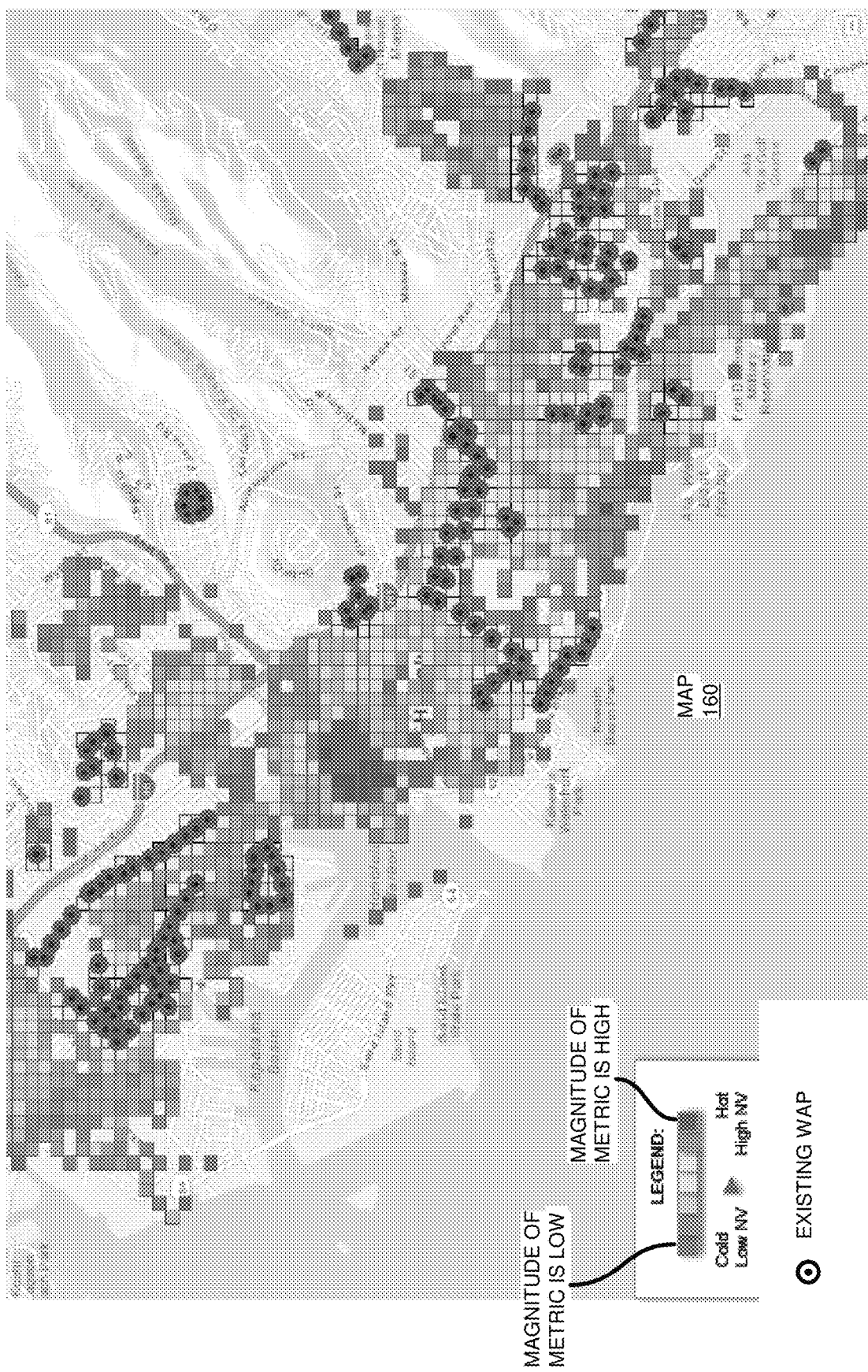
FIG. 7 is a more detailed example map diagram illustrating an installation heat map according to embodiments herein.

FIG. 7 is a more detailed example map diagram illustrating an installation heat map according to embodiments herein.

In one example embodiment, the map generated by map generator resource 150 is a heat map. In such an instance, the visual indications of the geographical regions are assigned a different color value depending on a magnitude of a respective installation metric generated for the geographical region. For example, a color spectrum can include the colors red, orange, yellow, green, blue, indigo, and violet. As mentioned, the values of the respective generated installation metrics (such as metrics M1, M2, M3, M4, . . . ) can be either positive or negative numbers depending upon whether installation of a respective wireless access point would result in a positive return-on-investment or a negative return-on-investment.

In one non-limiting example embodiment, geographical regions assigned near zero return-on-investment values are assigned a color of green (e.g., a middle of the color spectrum). Regions assigned highest positive return-on-investment values are assigned a color of red. Regions assigned a positive return-on-investment value between near zero and the highest positive return-on-investment values are assigned a color between red and green (such as orange or yellow) depending on a magnitude of a value generated for the installation metric. Regions colored red on the map are typically high traffic mobile device locations (resulting in generation of higher revenues) and where network resources are available nearby to install a respective wireless access point.

In certain instances, a respective value generated for an installation metric may be less than zero (e.g., negative). If further desired, in a similar manner, the negative values can be assigned a value between green and violet depending on their magnitude. For example, geographical regions assigned highest negative return-on-investment values can be assigned the color purple. Display settings can be chosen such that a respective heat map generated by map generator resource 150 displays only certain color or shaded regions. For example, a user may provide input to the map generator resource 150 to display visual indications for geographical regions where a magnitude of respective return-on-investment metrics are greater than zero.

In this example embodiment, the map 160 in FIG. 7 indicates locations of existing wireless access points (as specified by existing wireless access point information 126 as previously discussed) as well as a color coded square indicating a magnitude of a metric generated for the corresponding geographical region. As mentioned, in one embodiment, the map generator resource 150 provides a visual indication of value by applying a first color (such as RED) to a first portion of the map 700 representing a first geographical region, the first color indicates that a magnitude of a respective metric generated for the first geographical region has been assigned a first value; the map generator resource 150 applies a second color (such as ORANGE) to a second portion of the map 700 representing a second geographical region, the second color indicates that a magnitude of a respective metric generated for the second geographical region has been assigned a second value; the map generator resource 150 applies a third color (such as YELLOW) to a third portion of the map 700 representing a third geographical region, the third color indicates that a magnitude of a respective metric generated for the third geographical region has been assigned a third value; and so on.

As previously discussed, embodiments herein are useful over conventional techniques because they provide unique ways of quickly assessing the financial value of installing a respective new wireless access point in a geographical region. For example, subsequent to analyzing the different geographical regions and relevant parameters (such as usage information 120, network resource information 122, consumer business information 124, existing wireless access point information 128, land usage information 126, etc., to generate metrics (M1, M2, M3, M4, M5, . . . ), a corresponding map indicates one or more locations of a region of interest (such as within city) where it is makes most financial sense to install a respective one or more new wireless access points and the least cost method of installation (e.g., on an aerial cable, or attached to a structure using underground cable, etc.)

In addition to the above reasons, embodiments herein are further useful over conventional techniques because an operator is able to filter out regions that are not of particular interest. For example, a service provider may be interested in viewing locations of geographical regions where installation of a respective new wireless access point in a geographical region would result in a high return on investment above a threshold value. In such an instance, service provider can input a threshold value to the map generator resource 150. Map generator resource 150 then generates corresponding map 160 (or map 700) to indicate only regions in which the analyzer resource 140 generates a value for metric above the return-on-investment threshold value.

Figure 8:
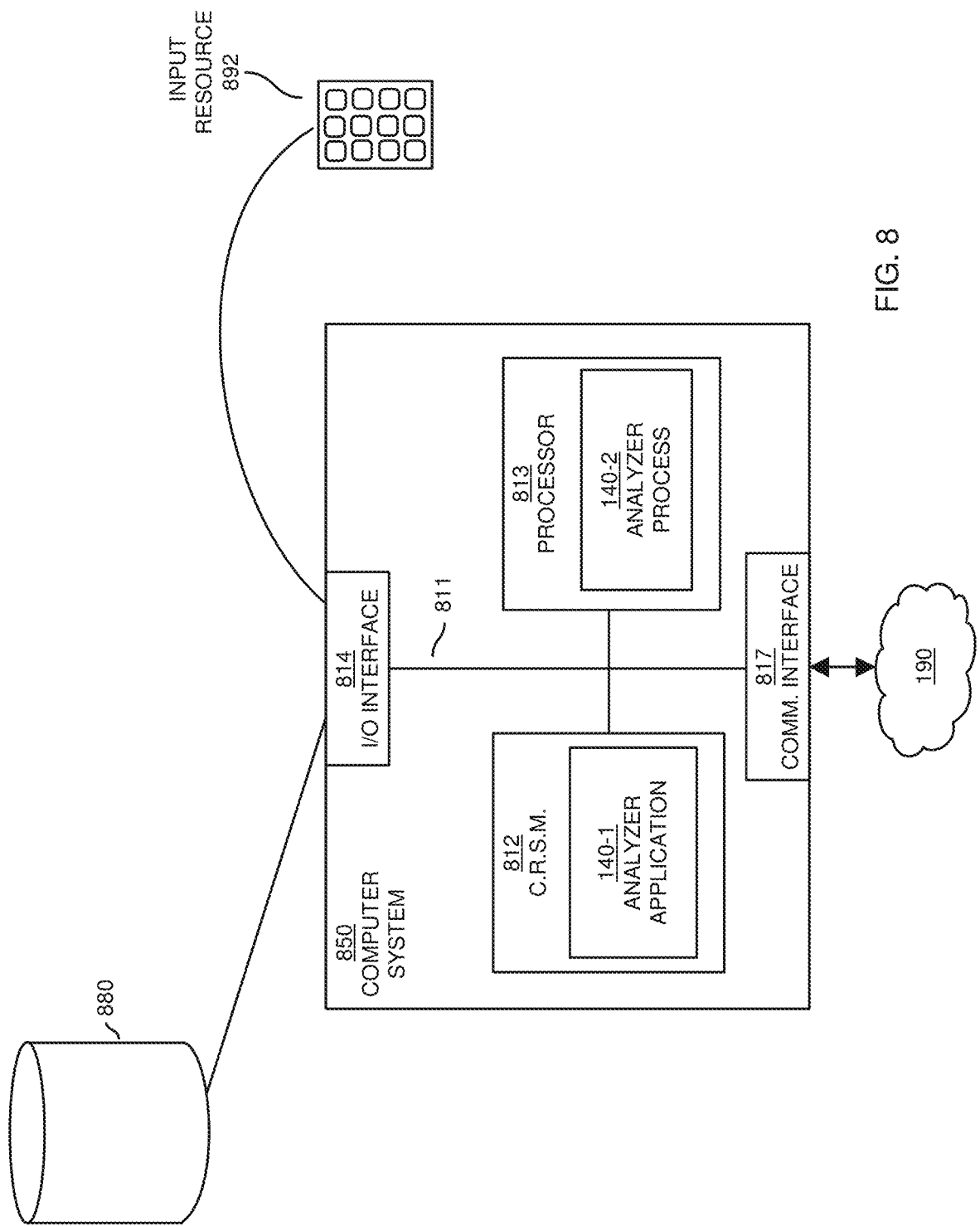
FIG. 8 is a diagram illustrating an example computer architecture in which to execute any functionality according to embodiments herein.

FIG. 8 is an example block diagram of a computer device for implementing any of the operations as discussed herein according to embodiments herein.

As shown, computer system 850 of the present example includes an interconnect 811, a processor 813 (such as one or more processor devices, computer processor hardware, etc.), computer readable storage medium 812 (such as hardware storage to store data), I/O interface 814, and communications interface 817.

Interconnect 811 provides connectivity amongst processor 813, computer readable storage media 812, I/O interface 814, and communication interface 817.

I/O interface 814 provides connectivity to a repository 880 and, if present, other devices such as a playback device, display screen, input resource 892, a computer mouse, etc.

Computer readable storage medium 812 (such as a non-transitory hardware medium) can be any hardware storage resource or device such as memory, optical storage, hard drive, rotating disk, etc. In one embodiment, the computer readable storage medium 812 stores instructions executed by processor 813 (i.e., computer processor hardware).

Communications interface 817 enables the computer system 850 and processor 813 to communicate over a resource such as network 190 to retrieve information from remote sources and communicate with other computers.

As shown, computer readable storage media 812 is encoded with analyzer application 140-1 (e.g., software, firmware, etc.) executed by processor 813. Analyzer application 140-1 can be configured to include instructions to implement any of the operations as discussed herein.

During operation of one embodiment, processor 813 (e.g., computer processor hardware) accesses computer readable storage media 812 via the use of interconnect 811 in order to launch, run, execute, interpret or otherwise perform the instructions in analyzer application 140-1 stored on computer readable storage medium 812.

Execution of the analyzer application 240-1 produces processing functionality such as analyzer process 140-2 in processor 813. In other words, the analyzer process 140-2 associated with processor 813 represents one or more aspects of executing analyzer application 140-1 within or upon the processor 813 in the computer system 850.

Those skilled in the art will understand that the computer system 850 can include other processes and/or software and hardware components, such as an operating system that controls allocation and use of hardware resources to execute analyzer application 140-1.

In accordance with different embodiments, note that computer system may be any of various types of devices, including, but not limited to, a wireless access point, a mobile computer, a personal computer system, a wireless device, base station, phone device, desktop computer, laptop, notebook, netbook computer, mainframe computer system, handheld computer, workstation, network computer, application server, storage device, a consumer electronics device such as a camera, camcorder, set top box, mobile device, video game console, handheld video game device, a peripheral device such as a switch, modem, router, or in general any type of computing or electronic device. The computer system 850 may reside at any location or can be included in any suitable resource in network environment 100 to implement functionality as discussed herein.

Functionality supported by the different resources will now be discussed via flowcharts in FIGS. 9 and 10. Note that the steps in the flowcharts below can be executed in any suitable order.

Figure 9:
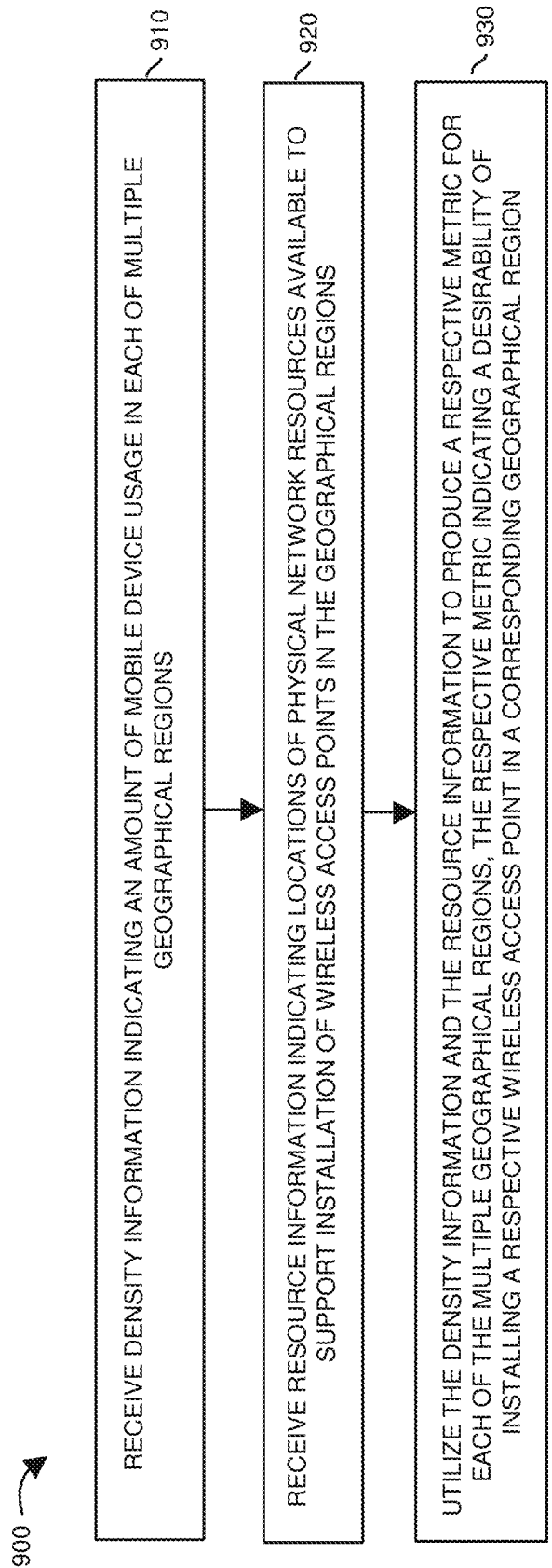
FIGS. 9 and 10 are example diagrams illustrating methods according to embodiments herein.
Figure 10:
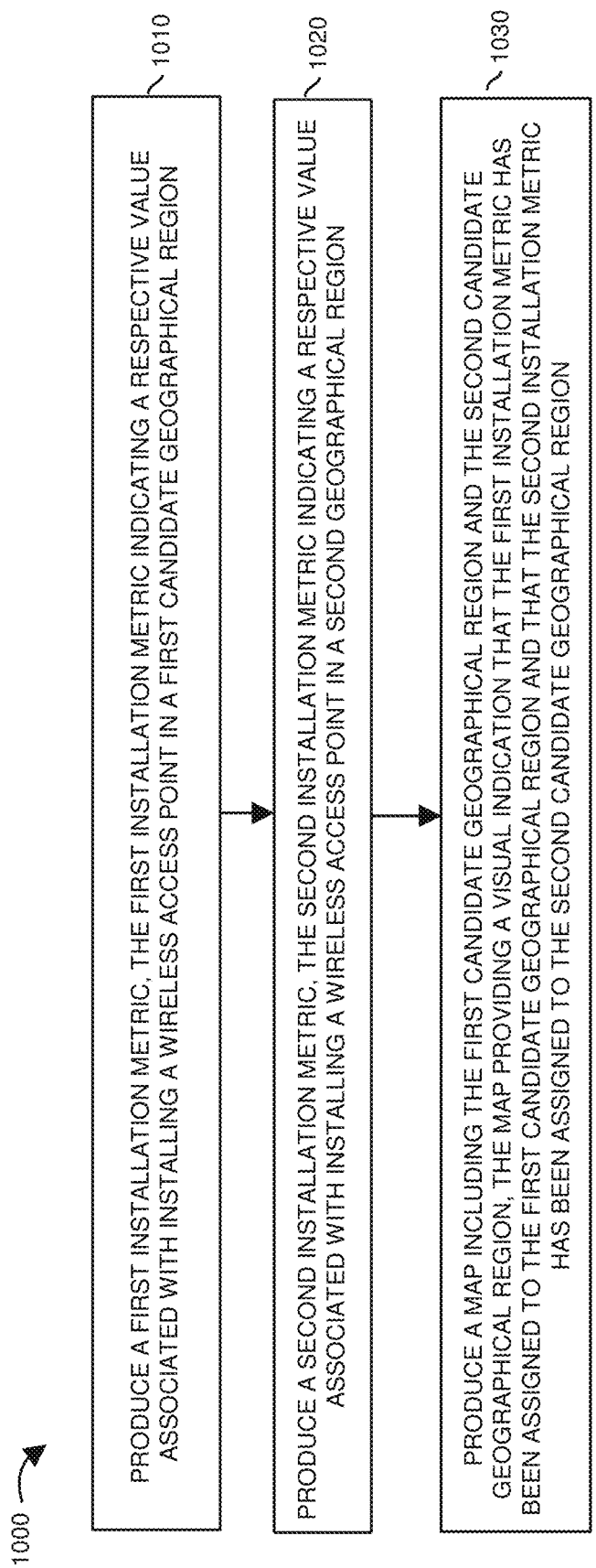

FIG. 9 is a flowchart 900 illustrating an example method according to embodiments. Note that there will be some overlap with respect to concepts as discussed above.

In processing block 910, the analyzer resource 140 receives density information (such as usage information 120) indicating an amount of mobile device usage in each of multiple geographical regions.

In processing block 920, the analyzer resource 140 receives resource information (such as network resource information 122) indicating locations of physical network resources available to support installation of wireless access points in the geographical regions.

In processing block 930, the analyzer resource 140 utilizes the density information and the resource information to produce a respective metric for each of the multiple geographical regions. Respective generated metrics indicate a desirability of installing a respective wireless access point in a corresponding geographical region FIG. 10 is a flowchart 1000 illustrating an example method according to embodiments. Note that there will be some overlap with respect to concepts as discussed above.

In processing block 1010, the analyzer resource 140 produces a first installation metric (such as M1). The first installation metric indicates a respective value associated with installing a wireless access point in a first candidate geographical region (211-1).

In processing block 1020, the analyzer resource 140 produces a second installation metric (such as M4). The second installation metric indicating a respective value associated with installing a wireless access point in a second geographical region (213-2).

In processing block 1030, the manager 150 produces a map 160 including the first candidate geographical region 211-1 and the second candidate geographical region 213-2. The map 160 provides a visual indication that the first installation metric (M1) has been assigned to the first candidate geographical region 211-1 and that the second installation metric (M2) has been assigned to the second candidate geographical region 213-4.

Note again that techniques herein are well suited for use in cable network environments in which a service provider analyzes geographical region for installation of one or more wireless access points. However, it should be noted that embodiments herein are not limited to use in such applications and that the techniques discussed herein are well suited for other applications as well.

Based on the description set forth herein, numerous specific details have been set forth to provide a thorough understanding of claimed subject matter. However, it will be understood by those skilled in the art that claimed subject matter may be practiced without these specific details. In other instances, methods, apparatuses, systems, etc., that would be known by one of ordinary skill have not been described in detail so as not to obscure claimed subject matter. Some portions of the detailed description have been presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm as described herein, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has been convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a computing platform, such as a computer or a similar electronic computing device, that manipulates or transforms data represented as physical electronic or magnetic quantities within memories, registers, or other information storage devices, transmission devices, or display devices of the computing platform.

While this invention has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting. Rather, any limitations to the invention are presented in the following claims.

We claim:

1. A method comprising:
receiving parameters specifying a region of interest;
subdividing the region of interest into a candidate pool of regions;
selecting multiple geographical regions from the candidate pool of regions;
receiving density information indicating an amount of mobile device usage in each of the multiple geographical regions;
receiving an overlay image of network support infrastructure from a data interface, the overlay image indicating locations of physical infrastructure available to support installation of wireless access points in the multiple geographical regions, wherein the overlay image includes an overlay of symbols with respect to the multiple geographical regions, the symbols representing the physical infrastructure, wherein the overlay image includes a proposed location of a respective new wireless access point in a corresponding geographical region;
utilizing a combination of the density information and the overlay image of network support infrastructure to produce a respective metric for each of the multiple geographical regions, the respective metric indicating a desirability of installing a respective new wireless access point in a corresponding geographical region; and
selecting installation of the respective new wireless access point in the corresponding geographical region depending on a magnitude of the respective metric for the corresponding geographical region.

2. The method as in claim 1 further comprising:
producing the respective metric for each of the corresponding geographical regions to take into account: i) subscription revenue received from subscribers operating mobile devices in the corresponding geographical region, and ii) costs of installing the respective new wireless access point in the corresponding geographical region.

3. The method as in claim 2, wherein the respective metric for each of the corresponding geographical regions indicates a degree to which installation of the respective new wireless access point by a wireless network service provider is anticipated to result in a financial gain to the wireless network service provider.

4. The method as in claim 3 further comprising:
producing a first metric, the first metric indicating a respective value associated with installing a first wireless access point in a first geographical region;
producing a second metric, the second metric indicating a corresponding value associated with installing a second wireless access point in a second geographical region;
displaying a map to include a representation of the first geographical region and a representation of the second geographical region; and
displaying, on the map, visual indications that the first geographical region has been assigned the first metric and that the second geographical region has been assigned the second metric.

5. The method as in claim 4, wherein the first metric is a different numerical value than the second metric; and
the method further comprising: i) applying a first visual indication to a first portion of the map representing the first geographical region, the first visual indication indicating that the first geographical region has been assigned the first metric, ii) applying a second visual indication to a second portion of the map representing the second geographical region, the second visual indication indicating that the second geographical region has been assigned the second metric.

6. The method as in claim 5, wherein the costs of installing the respective new wireless access point in the corresponding region takes into account a distance between i) a location of a network resource as specified by the resource information and ii) a location of the respective new wireless access point to be installed in the corresponding geographical region.

7. The method as in claim 2, wherein the costs of installing the respective new wireless access point in the corresponding region takes into account a distance between i) a location of a network resource as specified by the resource information and ii) a location of the respective new wireless access point to be installed in the corresponding geographical region.

8. The method as in claim 1, wherein selecting the multiple geographical regions from the candidate pool of regions includes:
utilizing the resource information to identify which of the regions in the candidate pool resides within a threshold distance of a corresponding physical network resource available to support installation of the respective new wireless access point.

9. The method as in claim 1, wherein selecting the multiple regions from the candidate pool of regions includes:
utilizing the density information to identify which of the regions in the candidate pool is frequented by more than a threshold number of mobile device users.

10. The method as in claim 9, wherein selecting the multiple geographical regions from the candidate pool of regions includes:
utilizing the resource information to identify which of the regions in the candidate pool resides within a threshold distance of a corresponding physical network resource available to support installation of the respective new wireless access point.

11. The method as in claim 10, wherein selecting the multiple regions from the candidate pool of regions includes:
utilizing the density information to identify which of the regions in the candidate pool is frequented by more than a threshold number of mobile device users.

12. The method as in claim 11, wherein selecting the multiple regions from the candidate pool of regions includes:
filtering out regions in the candidate pool in which an existing access point resource is already installed.

13. The method as in claim 1, wherein selecting the multiple regions from the candidate pool of regions includes:
filtering out regions in the candidate pool in which an access point resource is already installed.

14. The method as in claim 1, wherein the respective metric for a corresponding geographical region takes into account anticipated costs of installing the respective new wireless access point in the corresponding geographical region and estimated revenues to be generated by installation of the new respective wireless access point in the corresponding geographical region.

15. The method as in claim 1 further comprising:
producing a first metric, the first metric indicating a respective value associated with installing a first new wireless access point in a first geographical region of the multiple geographical regions;
producing a second metric, the second metric indicating a respective value associated with installing a second new wireless access point in a second geographical region of the multiple geographical regions;
producing a map to include a representation of the first geographical region and a representation of the second geographical region; and
providing visual indications on the map to indicate that the first geographical region has been assigned the first metric and that the second geographical region has been assigned the second metric.

16. The method as in claim 1 further comprising:
displaying a first visual indication in a representation of a first geographical region of the multiple geographical regions, the first visual indication representing a first metric assigned to the first geographical region; and
displaying a second visual indication in a representation of a second geographical region of the multiple geographical regions, the second visual indication representing a second metric assigned to the second geographical region.

17. The method as in claim 16, wherein displaying the first visual indication includes displaying a first shading; and
wherein displaying the second visual indication includes displaying a second shading, the second shading different than the first color.

18. The method as in claim 1 further comprising:
producing a first metric, the first metric indicating a respective value associated with installation of a first wireless access point in a first geographical region; and producing a second metric, the second metric indicating a corresponding value associated with installation of a second wireless access point in a second geographical region.

19. The method as in claim 18, wherein the first metric is a different numerical value than the second metric; and
the method further comprising: i) applying a first visual indication to a first portion of a map representing the first geographical region, the first visual indication indicating that the first geographical region has been assigned the first metric, ii) applying a second visual indication to a second portion of the map representing the second geographical region, the second visual indication indicating that the second geographical region has been assigned the second metric.

20. The method as in claim 1, wherein the magnitude of the respective metric depends at least in part on availability of physical network resources in the corresponding geographical region as indicated by the resource information.

21. The method as in claim 20, wherein the magnitude of the respective metric depends at least in part on a respective amount of mobile device usage in the corresponding geographical region.

22. The method as in claim 1, wherein the overlay image includes a representation of streets located in the multiple geographical regions; and
wherein the symbols of the overlay image indicate locations of the physical network resources.

23. The method as in claim 1, wherein utilizing the combination of the density information and the overlay image to produce the respective metric includes:
calculating a cost of installing the new wireless access point in the candidate geographical region based on a distance between: i) a first location of a network resource on the overlay image providing network access, and ii) a second location on the overlay image indicating where the respective new wireless access point is to be installed in the corresponding geographical region.

24. The method as in claim 1, wherein the overlay image is an overlay of the network support infrastructure with respect to the multiple geographical regions.

25. The method as in claim 24, wherein the overlay image indicates boundaries of the multiple geographical regions.

26. The method as in claim 1 further comprising:
calculating a cost of installing the respective wireless access point in the corresponding geographical region based on a distance between the proposed location and the network support infrastructure; and
producing the respective metric based at least in part on the calculated cost.

27. A method comprising:
receiving density information indicating an amount of mobile device usage in each of multiple geographical regions;
receiving an overlay image of network support infrastructure from a data interface, the overlay image indicating locations of physical infrastructure available to support installation of wireless access points in the multiple geographical regions;
utilizing a combination of the density information and the overlay image of network support infrastructure to produce a respective metric for each of the multiple geographical regions, the respective metric indicating a desirability of installing a respective new wireless access point in a corresponding geographical region;
wherein the respective metric for the corresponding geographical region takes into account presence of consumer-visited businesses located in the corresponding geographical region;
wherein the overlay image includes an overlay of symbols with respect to representations of the multiple geographical regions, the symbols representing the physical infrastructure;
wherein the overlay image includes a proposed location of the respective new wireless access point in the corresponding geographical region; and
the method further comprising: selecting installation of the respective new wireless access point in the corresponding geographical region depending on a magnitude of the respective metric for the corresponding geographical region.

28. A system comprising:
a hardware storage resource; and
computer processor hardware coupled to the hardware storage resource, the computer processor hardware operable to:
receive density information indicating an amount of mobile device usage in each of multiple geographical regions;
receive an overlay image of network support infrastructure, the overlay image indicating locations of physical infrastructure available to support installation of wireless access points in the multiple geographical regions;
utilize a combination of the density information and the overlay image of network support infrastructure to produce a respective metric for each of the multiple geographical regions, the respective metric indicating a desirability of installing a respective wireless access point in a corresponding geographical region;
wherein the overlay image includes an overlay of symbols with respect to representations of the multiple geographical regions, the symbols representing the physical infrastructure;
wherein the overlay image includes a proposed location of a respective new wireless access point in a corresponding geographical region;
produce the respective metric for each of the corresponding geographical regions to take into account: i) subscription revenue received from subscribers operating mobile devices in the corresponding geographical region, and ii) costs of installing the respective wireless access point in the corresponding geographical region; and
wherein the costs of installing a respective wireless access point in the corresponding region takes into account a distance between i) a location of a network resource as specified by the resource information and ii) a location of the respective wireless access point to be installed in the corresponding geographical region; and
wherein the computer processor hardware is further operative to select installation of the respective new wireless access point in the corresponding geographical region depending on a magnitude of the respective metric for the corresponding geographical region.

29. The system as in claim 28, wherein the respective metric for each of the corresponding geographical regions indicates a degree to which installation of the respective wireless access point by a wireless network service provider is anticipated to result in a financial gain to the wireless network service provider.

* * * * *